United States Patent
Hanig

(10) Patent No.: US 7,025,555 B2
(45) Date of Patent: Apr. 11, 2006

(54) SWEEP AUGER WITH DRIVE ASSEMBLY

(75) Inventor: John A. Hanig, Sheffield, IA (US)

(73) Assignee: Sukup Manufacturing Company, Sheffield, IA (US)

( * ) Notice: Subject to any disclaimer, the term of this patent is extended or adjusted under 35 U.S.C. 154(b) by 155 days.

(21) Appl. No.: 10/437,604

(22) Filed: May 14, 2003

(65) Prior Publication Data

US 2004/0228711 A1 Nov. 18, 2004

(51) Int. Cl.
*B65G 65/46* (2006.01)

(52) U.S. Cl. .................... 414/326; 366/261; 414/319

(58) Field of Classification Search .............. 414/319, 414/320, 326; 105/96.1, 97; 366/261
See application file for complete search history.

(56) References Cited

U.S. PATENT DOCUMENTS

| 1,970,606 | A | * | 8/1934 | Kendall et al. | .......... 105/163.1 |
| 2,976,745 | A | * | 3/1961 | Bade | .......... 74/606 R |
| 3,538,618 | A | * | 11/1970 | Neuenschwander | .......... 34/102 |
| 3,750,807 | A | * | 8/1973 | Jackson | .......... 414/808 |
| 3,755,917 | A | * | 9/1973 | Lambert, Jr. | .......... 34/179 |
| 4,063,654 | A | * | 12/1977 | Shivvers | .......... 414/309 |
| 4,274,750 | A | * | 6/1981 | Smit | .......... 366/261 |
| 4,352,406 | A | * | 10/1982 | Fahrenschon | .......... 180/308 |
| 4,701,093 | A |   | 10/1987 | Meyer |   |
| 4,772,173 | A | * | 9/1988 | Buschbom et al. | .......... 414/320 |
| 5,007,351 | A | * | 4/1991 | Muth | .......... 105/101 |

FOREIGN PATENT DOCUMENTS

JP 58-69633 * 4/1983

* cited by examiner

*Primary Examiner*—Thomas J Brahan

(57) ABSTRACT

A sweep auger having an auger that is rotated about its longitudinal axis by a power means and a drive assembly having at least three reduction gears that operatively connect the auger to a drive wheel such that the drive wheel rotates at a speed that is substantially less than the rotational speed of the auger.

4 Claims, 6 Drawing Sheets

SWEEP AUGER WITH DRIVE ASSEMBLY

BACKGROUND OF THE INVENTION

This invention relates to an auger apparatus, and more particularly to sweep augers suitable for moving granular material across the floor of a circular storage bin toward the center of the bin.

Sweep augers have long been used to unload grain or other granular material from circular storage bins. In such apparatus, a radially disposed auger rotates about its own axis to drag the granular material to an unloading sump at the center of the bin. Simultaneously, the auger revolves around the central vertical axis of the bin to advance across the bin floor in a sweeping action. The auger shaft typically is rotated by power means connected to the radially inner end of the shaft. A drive wheel often is attached to the radially outer end of the auger shaft for rotation therewith to support the outer portion of the auger, as well as to assist in driving the auger in its sweeping motion. While such arrangements provide for ease of manufacturing, certain operating and other disadvantages are inherent in the equipment. Auger shafts typically rotate at several hundred revolutions per minute to achieve the desired unloading capacity. However, this results in a peripheral velocity of the support wheel which is far greater than the rate of advancement of the outer end of the auger and hence of the wheel. This results in excessive slippage of the wheel on the support floor. Hence, the drive wheel wears out quickly if its periphery is made of rubber or other relatively soft traction material, as is desirable to provide sufficient frictional engagement with the steel bin floor to accomplish the sweeping motion. On the other hand, if the drive wheel periphery were made of steel or other hard material, the wheel often would not provide adequate traction for satisfactorily advancing the auger into the granular material, and would wear the bin floor.

In the past, the aforesaid disadvantages have been overcome or minimized only with more complex apparatus and at considerably greater expense. In one such instance (see U.S. Pat. No. 3,127,032) a separate drive shaft extends coaxially through the auger shaft and drives a sprocket at a rotational speed independent of the speed of the rotating auger, the sprocket engaging a circular perforated track to provide a positive drive during the sweeping action. In other instances, auxiliary motors have been provided to drive sprockets or gears which similarly engage circular tracks to effect a positive drive for sweeping (see e.g., U.S. Pat. Nos. 3,356,235; 3,391,809; and 3,489,643). In yet another instance (see U.S. Pat. No. 4,063,654), a sweep auger shaft rotatably carries a floor engaging wheel which rides on a smooth portion of a circular track and, in addition, speed reduction gearing is driven from the auger shaft to operate an eccentrically mounted drive ratchet which engages a toothed portion of the track to effect a positive drive during the sweeping action. All of these constructions are unnecessarily cumbersome and expensive.

More recently (see U.S. Pat. No. 4,701,093) a speed reduction drive system having a sprocket mounted on a shaft to engage a sprocket chain secured to a drive wheel is coupled to the auger and drives the wheel at a reduced speed relative to the rotation of the auger. The speed reduction ratio is determined by the dimensions of the sprocket and sprocket chain which based on size limitations due to the construction of sweep augers, makes certain higher speed reduction ratios impracticable.

A higher speed reduction ratio between the rotational speed of the auger and that of the drive wheel is desired as slower rotational speed of the drive wheel extends the life of both the drive wheel and the floor since the surface areas of both the wheel and the floor will not wear down as fast. In addition, higher speed reduction ratio places less stress and bending on the end of the backboard and allows more time for grain to be transported away along the middle of the sweep auger. The need for a higher speed reduction ratio increases as storage bins get larger, for both of these reasons.

It is an object of this invention to provide improved drive arrangement for sweep augers.

A further object of this invention is to provide an economical sweep auger apparatus which avoids the problems of the aforementioned apparatus.

Another object of the invention is to provide an improved sweep auger apparatus which enables the auger shaft to be rotated about its longitudinal axis at a speed sufficient to achieve the desired bin unloading capacity and at the same time to drive a drive wheel on the apparatus at such sufficiently lesser speed than conventional devices that the wheel engages the bin floor with greatly reduced slippage as the auger revolves around the central vertical axis of the bin in unloading material from the bin.

A further object of the invention is to provide a sweep auger apparatus which may be effectively employed to unload granular material from a circular storage bin without requiring a special circular track or the like around the periphery of the bin floor to effect a positive drive for the sweeping action.

A still further object of this invention is to provide an economical sweep auger apparatus in which a single power source is employed both to rotate the auger about its longitudinal axis and to rotate the drive wheel which supports the radially outer end of the auger at a substantially lesser speed.

These and other objectives will become apparent to those skilled in the art based on the following disclosure.

BRIEF SUMMARY OF THE INVENTION

The sweep auger apparatus of this invention has an auger with a longitudinal axis that extends radially from the center of a circular storage bin. A power means, operatively connected to a first end of the auger, rotates the auger about its longitudinal axis. A drive assembly operatively connects the auger to a drive wheel and by utilizing a combination of at least three reduction gears, the drive assembly rotates the drive wheel at a speed substantially less than the rotational speed of the auger.

DESCRIPTION OF THE PREFERRED EMBODIMENTS

Figure 1:
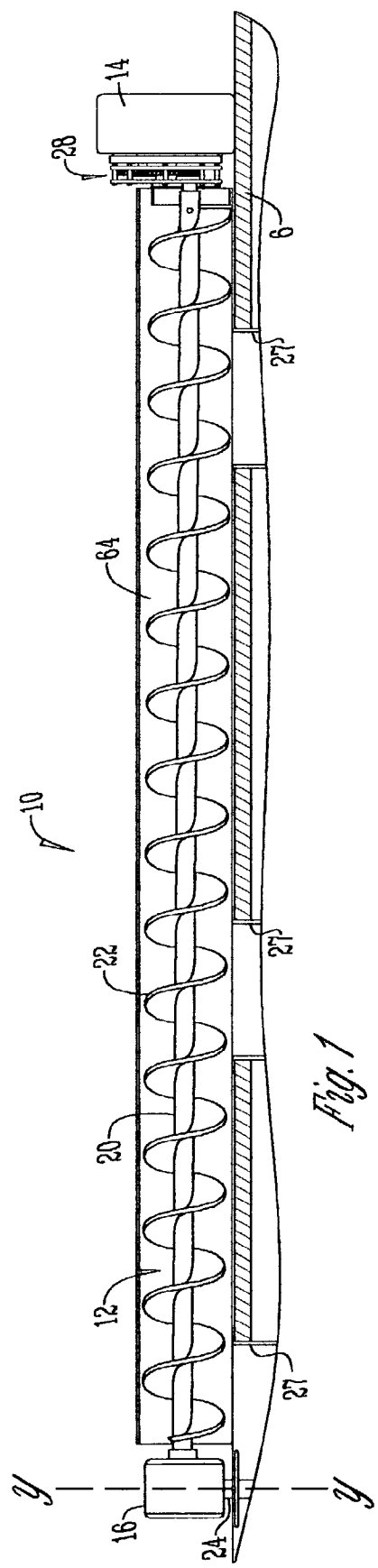
FIG. 1 is a longitudinal side view, partially broken away, illustrating one embodiment of a sweep auger apparatus radially disposed above the floor of a circular storage bin and employing the invention.

Referring to the figures, the sweep auger apparatus 10 is assembled in relation to a circular grain storage bin 2 having a vertical and generally cylindrical sidewall 4 and a circular false bottom or floor 6, e.g., a bin as shown in Sukup U.S. Pat. No. 3,532,232, which is incorporated herein by reference.

The apparatus 10 includes a radially extending sweep auger 12 and drive wheel 14 that is rotatably mounted within the bin 2 above the false floor 6. A drive train for operating the apparatus 10 includes a drive unit housing 16 at the center of the bin with a drive element engaging the end of the auger to operatively connect the inner end of the auger 12 to the drive train. The auger 12 includes an axial drive shaft 20 and helical flighting 22 secured to the shaft 20. Rotatably connected to the distal end of the auger 12 is a drive wheel 14 that supports the outer end of the auger 12 about the central vertical axis y—y of the bin 2.

The housing 16 encloses a power means that may include suitable gears and/or a motor (not shown) for rotating the auger 12 about its longitudinal axis. Alternatively, the housing 16 may enclose only suitable gearing engaging a vertical shaft 24 that extends below the false floor 6 and is driven by a motor (not shown) located below the floor 6 or outside the storage bin.

In operation, the auger 12 rotates about its longitudinal axis as the apparatus 10 revolves around the central vertical axis y—y causing granular material (not shown) stored in the bin to move across the floor 6 toward and into a central sump opening 26. The stored material typically is a free-flowing material such as, e.g., shelled corn. After the granular material falls through the central opening 26, it may be transported outside the bin by an unloading conveyor (not shown) beneath the floor. The grain in the bin 2 is first unloaded via gravity through the central sump 26 and then through intermediate sump openings 27 which are aligned with the unloading conveyor along the false floor 6. The apparatus 10 then removes the remaining grain in the bin 2.

Figure 2:
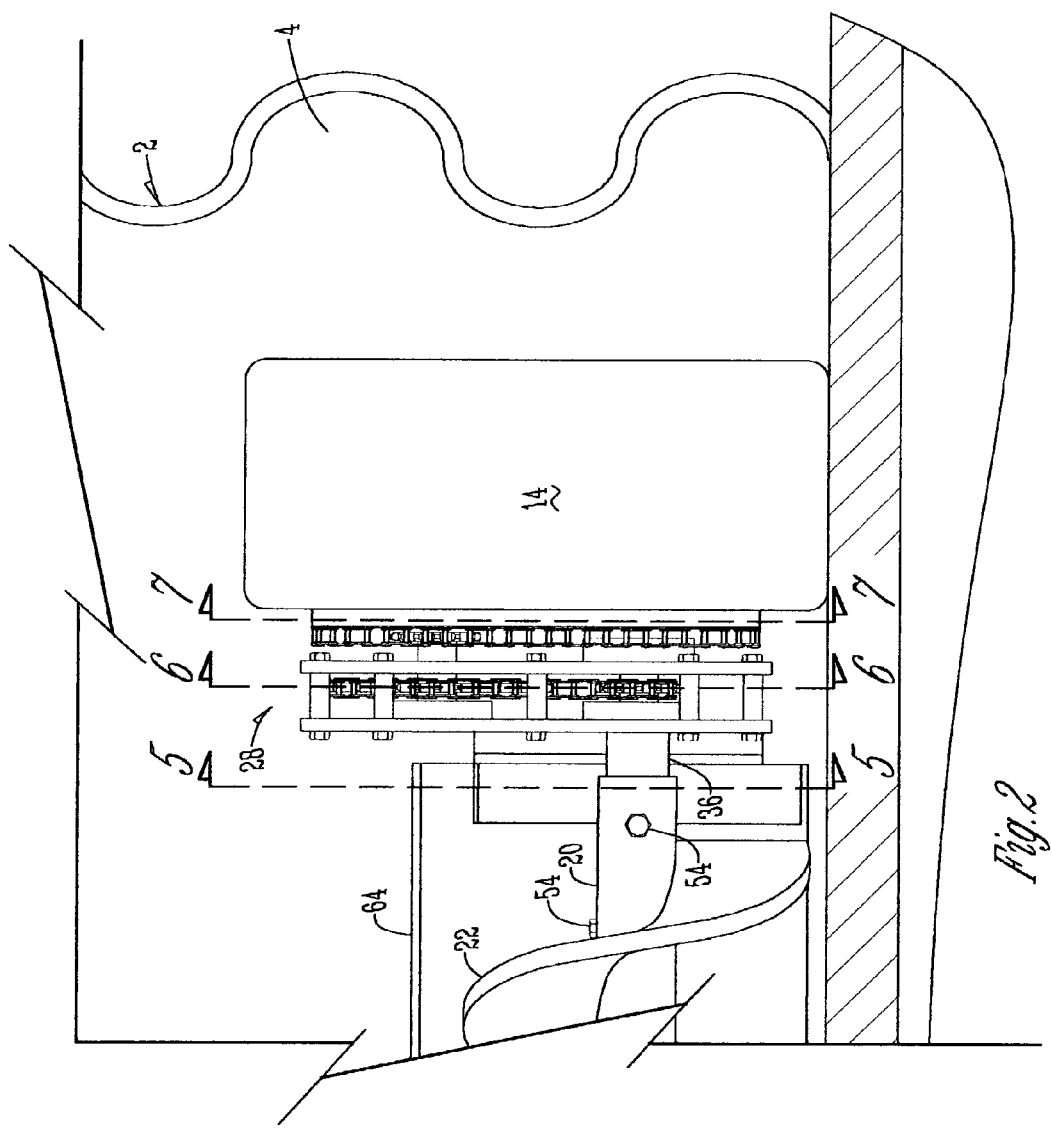
FIG. 2 is an enlarged side view, partially in section, of the radially outer end of the apparatus of the invention shown in FIG. 1.
Figure 3:
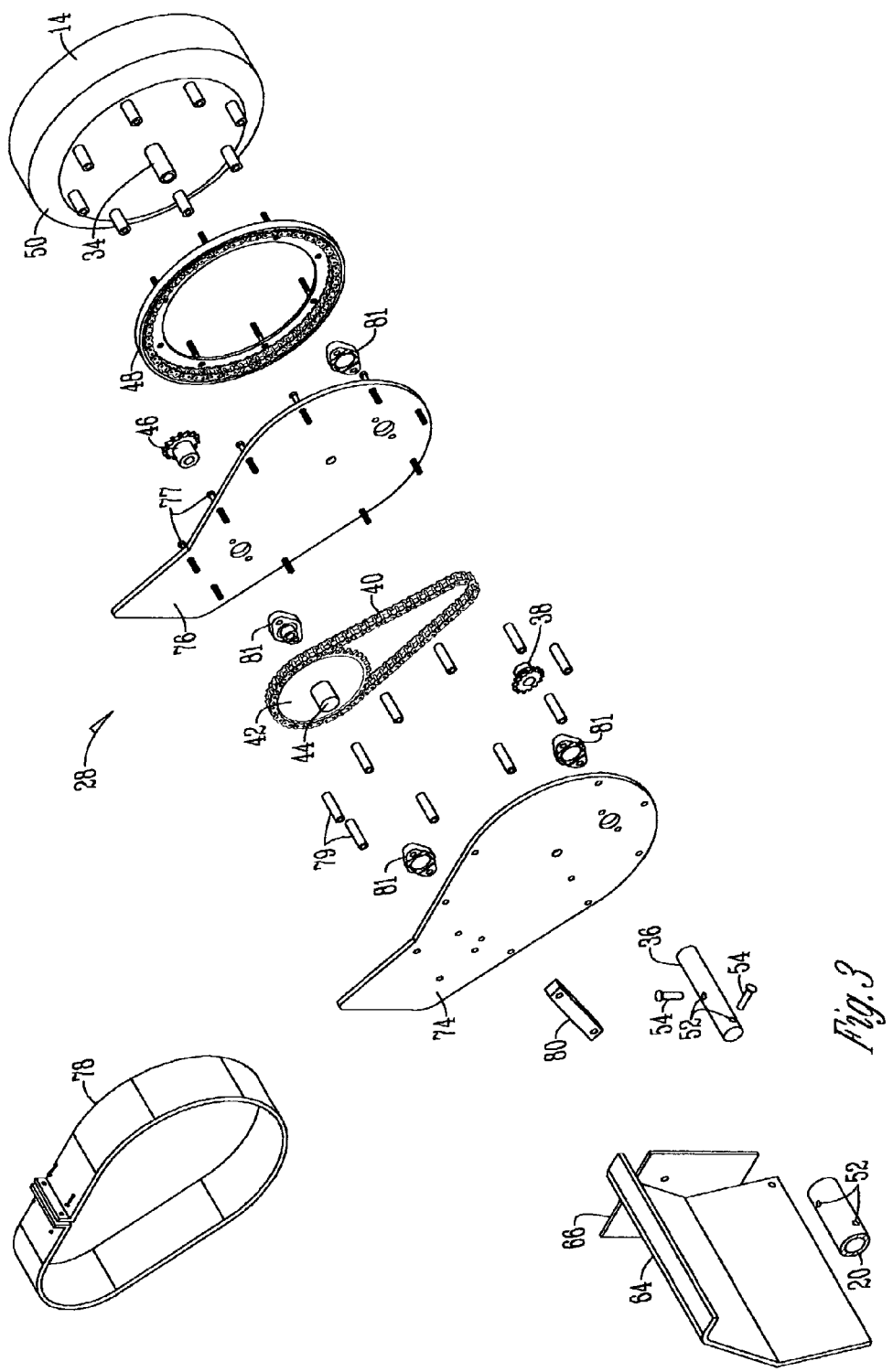
FIG. 3 is an exploded perspective view of the apparatus.
Figure 4:
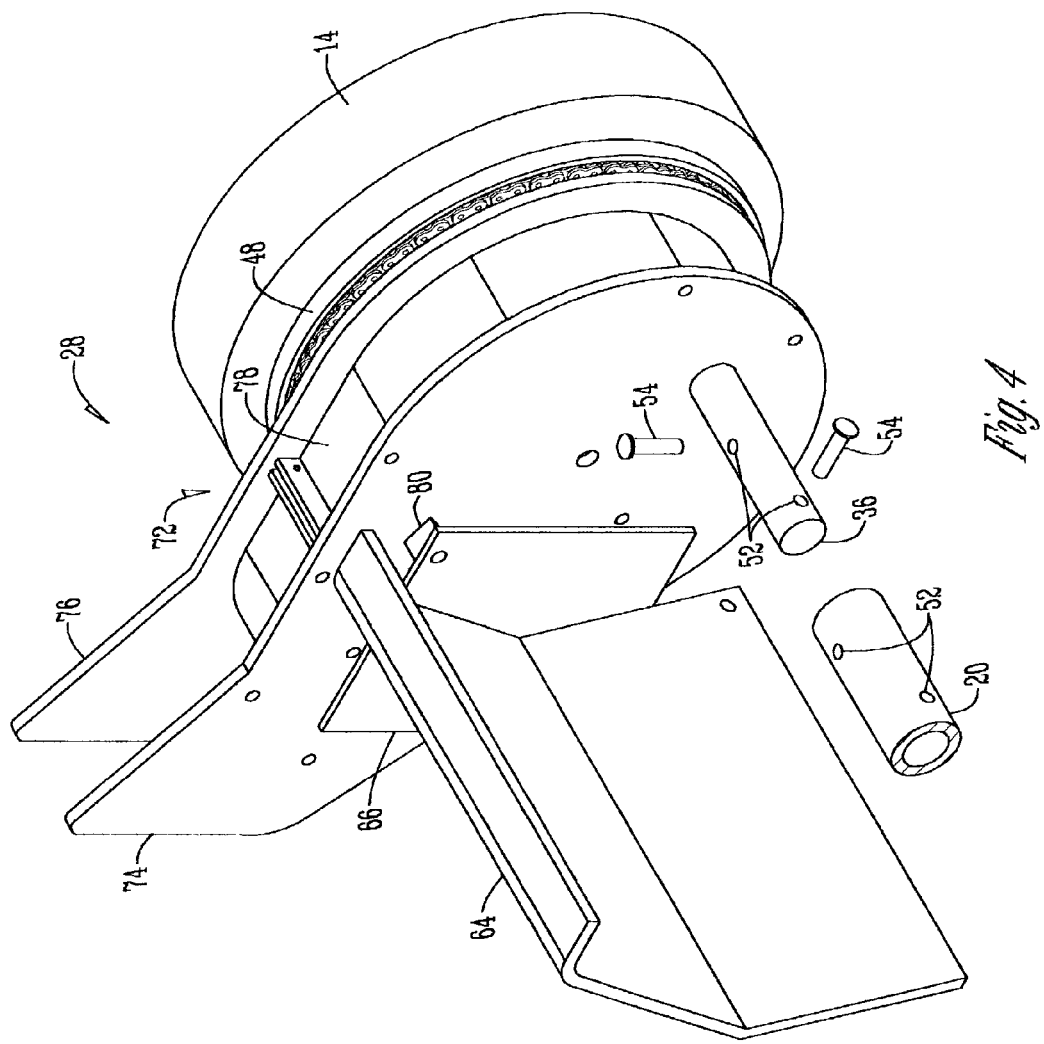
FIG. 4 is a perspective view of the radial end of the apparatus.
Figure 5:
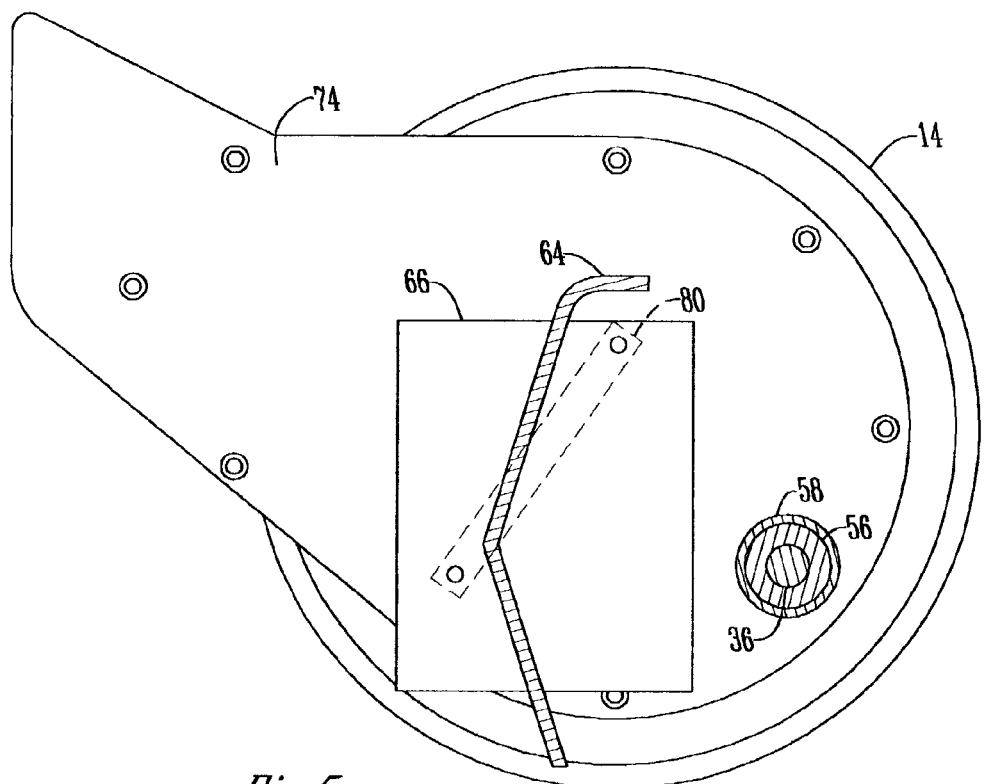
FIG. 5 is a partial sectional view of the drive wheel assembly of the apparatus of the invention, taken in the direction of the arrows 5—5 of FIG. 2.
Figure 6:
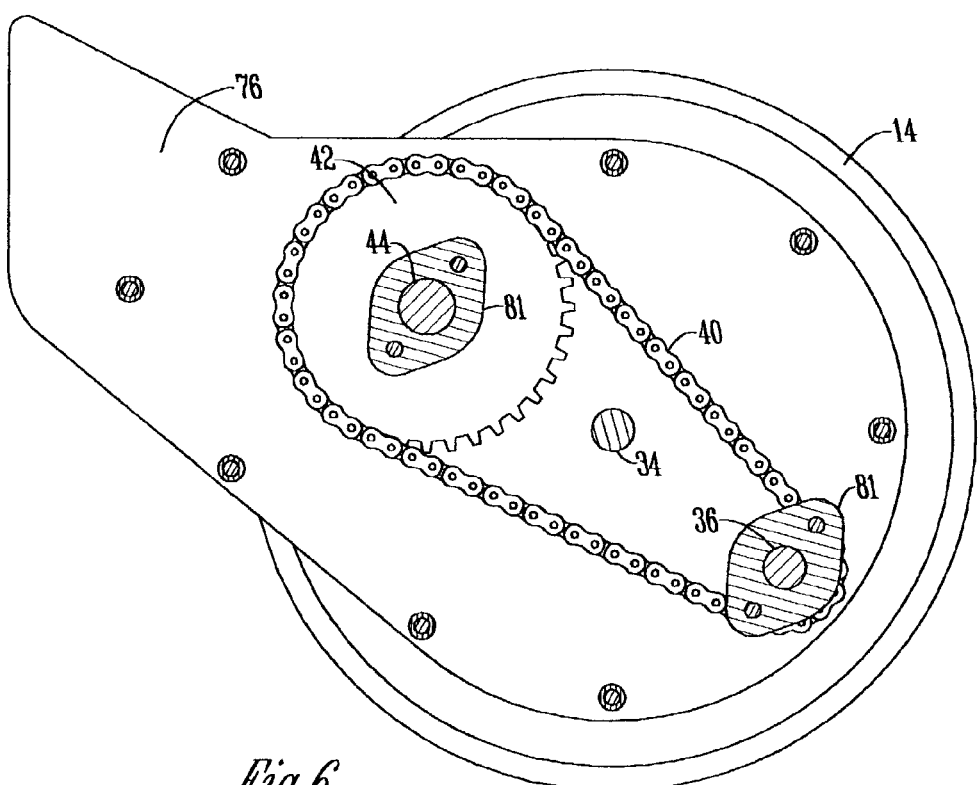
FIG. 6 is a partial sectional view of a portion of the drive wheel assembly taken in the direction of the arrows 6—6 of FIG. 2.
Figure 7:
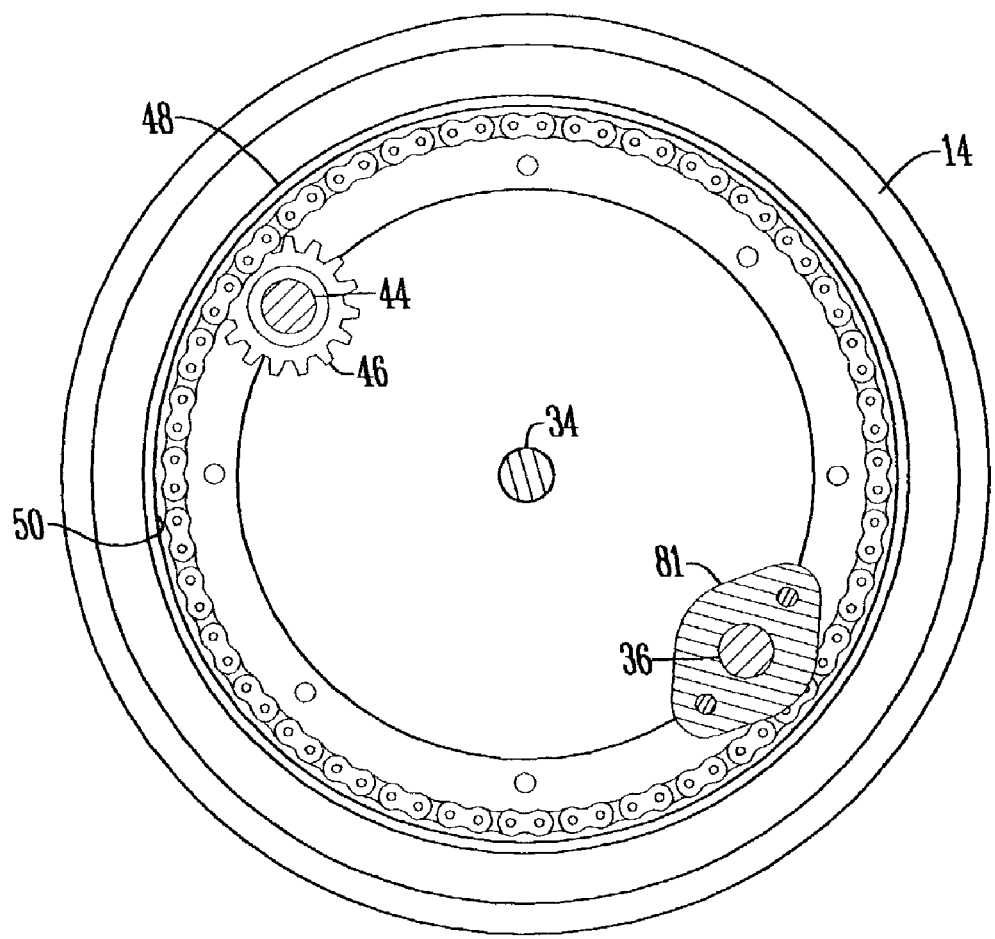
FIG. 7 is a partial sectional view of a portion of the drive wheel assembly taken in the direction of arrows 7—7 of FIG. 2.

As best seen in FIGS. 2–5, the drive assembly 28 comprises a rotatably mounted drive wheel 14 at the outer or distal end of the auger assembly 10, and a speed reduction gear assembly for coupling with the auger shaft 20 and driving the wheel 14 which is rotatably mounted on shaft 34. The gear assembly can include a variety of combinations of gears with varying construction. As an example, a reduction gear may consist of a sprocket mounted on a shaft that rotates within a bearing.

The gear assembly includes a first reduction gear having a first shaft 36 and a sprocket 38 secured to the shaft 36 for rotation therewith. The sprocket 38 engages a sprocket chain 40 that is also engaged by a second reduction gear having a second sprocket 42 supported on a second shaft 44. It is preferred that the first shaft 36 is positioned forwardly and downwardly of the second shaft 44 to achieve the optimum height of the flighting 22 above the floor 6. On the opposite end of the second shaft 44 is a third reduction gear having a third sprocket 46 that engages an annular mating sprocket chain 48 secured to the drive wheel 14 as described further below.

The drive wheel 14 rolls on the floor 6 of the bin and thus supports the radially outer end of the sweep auger apparatus 10. The circularly disposed sprocket chain 48 is fixedly secured to the inner periphery 50 of the drive wheel 14 and effectively but very economically forms a large annular internal gear which is engaged by the sprocket 46. The sprocket chain 48 can be secured to the drive wheel in any conventional manner such as by bolts shown in FIG. 3. By reason of this construction, when the drive wheel assembly 28 is operatively connected as a part of the sweep auger apparatus 10, rotation of shaft 20 causes rotation of the drive wheel 14 in the same direction, but at a greatly reduced speed of rotation. The combination of the sprockets 38, 42 and 46 and sprocket chains 40 and 48 are selected to obtain a desired velocity of wheel 14 relative to the velocity of the auger 12. In one embodiment an approximately 17 to 1 speed reduction is used, e.g., when the drive shaft 20 and hence shaft 36 are caused to rotate at approximately 400 r.p.m. the drive wheel 14 rotates at approximately 23.5 r.p.m. The wheel 14 will provide a steady advancing force to continuously press the auger 12 into the pile of remaining material, with slippage of the wheel accommodating the slow advance while assuring continued force of the auger into the material. However, the slippage is controlled and greatly reduced as compared, for example, to prior devices. In addition, the slower speed of the drive wheel places less stress on the backboard since there is more time for the auger to take away the grain.

The gear assembly is partially covered by a gear reduction housing 72 that is comprised of a first side plate 74, a second side plate 76, and a casing cover 78.

The attachment of the drive wheel assembly 28 to the auger is best described as follows. The inner end of shaft 36 is snuggly and coaxially received in the outer end of the auger shaft 20 and is fixed thereto by means of holes 52 and mating pins 54. First shaft 36 extends through apertures in plates 74 and 76 and is secured to the plates by bearings 81 for rotation of the shaft. Second shaft 44 extends through plate 76 and is secured to plates 74 and 76 by bearings 81 for rotation of the shaft 44. Shaft 34 extends through a central aperture of plates 74 and 76 and is secured to plate 74. The drive wheel 14 has a bushing that rotates about shaft 34.

A plurality of bolts 77 extend through a plurality of apertures in plate 76, a plurality of spacer sleeves 79 positioned between the plates, and a plurality of apertures in plate 74 to further secure and separate the two plates. The casing cover 78 extends around and between the outer periphery of plates 74 and 76 and is secured in any conventional manner.

A vertical backboard 64 extends the full length of the auger 12 and is disposed proximate to its trailing edge. The backboard 64 is fixedly secured at its inner end to the housing 16 and the drive assembly 28 at its outer end. The backboard has a flange 66 that extends transversely to the longitudinal axis of the backboard 64 at the backboard's outer end. The drive assembly 28 includes a brace member 80 that is secured to side plate 74 and then attached to flange 66 of backboard 64 to assist in maintaining the gear reduction housing 72 in a vertical position.

What is claimed is:

1. A sweep auger apparatus for use in a circular storage bin, the apparatus comprising:
   an auger having a longitudinal axis extending radially from a center of the bin;
   a power means operatively connected to a first end of the auger for rotating the auger about its longitudinal axis;
   a drive assembly mounted on a second end of the auger that is operatively connected to a drive wheel and rotates the drive wheel at a speed substantially less than the speed of rotation of the auger to advance the drive wheel in a radial path around the bin;
   said drive assembly having at least three reduction gears operatively connecting the auger to the drive wheel; and
   wherein a first of the three reduction gears is rotatably mounted on a first shaft in alignment with the rotational axis of the auger, a second of the three reduction gears operatively connected to the first reduction gear and mounted on a second shaft, and a third of three reduction gears rotatably mounted on the second shaft and rotatably engaging the drive wheel, said drive wheel having a sprocket chain wherein the third of three reduction gears is rotatably disposed within the sprocket chain.

2. The apparatus of claim 1 wherein the second reduction gear is positioned rearwardly and upwardly of a first reduction gear.

3. The apparatus of claim 1 wherein the second reduction gear has a diameter greater than the diameter of the first and third reduction gear.

4. The apparatus of claim 1 wherein a ratio of the speed of rotation of the auger in relation to the speed of rotation of the drive wheel is at least seventeen to one.

* * * * *